United States Patent [19]

Deabriges

[11] 4,336,235

[45] Jun. 22, 1982

[54] PROCESS FOR THE MANUFACTURE OF SODIUM SILICATE

[75] Inventor: Jean Deabriges, Aix-en-Provence, France

[73] Assignee: Produits Chimiques Ugine Kuhlmann, Courbevoie, France

[21] Appl. No.: 161,437

[22] Filed: Jun. 20, 1980

[30] Foreign Application Priority Data

Jul. 25, 1979 [FR] France .................................. 79 19149

[51] Int. Cl.³ ............................................... C01B 33/32
[52] U.S. Cl. ...................................... 423/332; 423/334
[58] Field of Search .................................. 423/332, 334

[56] References Cited

U.S. PATENT DOCUMENTS 2,219,646 10/1940 Beecher ................................ 423/334
2,829,030 4/1958 Habernickel ........................ 423/334
2,881,049 4/1959 Erbe et al. ............................ 423/332
2,988,423 6/1961 McDaniel ............................ 423/332

FOREIGN PATENT DOCUMENTS 299763 3/1929 United Kingdom ................ 423/332

*Primary Examiner*—Edward J. Meros
*Attorney, Agent, or Firm*—Sigalos & Levine

[57] ABSTRACT

The present invention comprises a process for the manufacture of a sodium silicate solution in a continuous manner from a silicon dioxide-containing material, comprising continuously adding to a reaction zone a stream of said silicon dioxide-containing material and a stream of a sodium hydroxide-sodium carbonate solution, reacting said silicon dioxide-containing material and said sodium hydroxide-sodium carbonate at a temperature and pressure and for a time sufficient to form a sodium silicate solution, and recovering said sodium silicate solution from the reaction zone.

6 Claims, 1 Drawing Figure

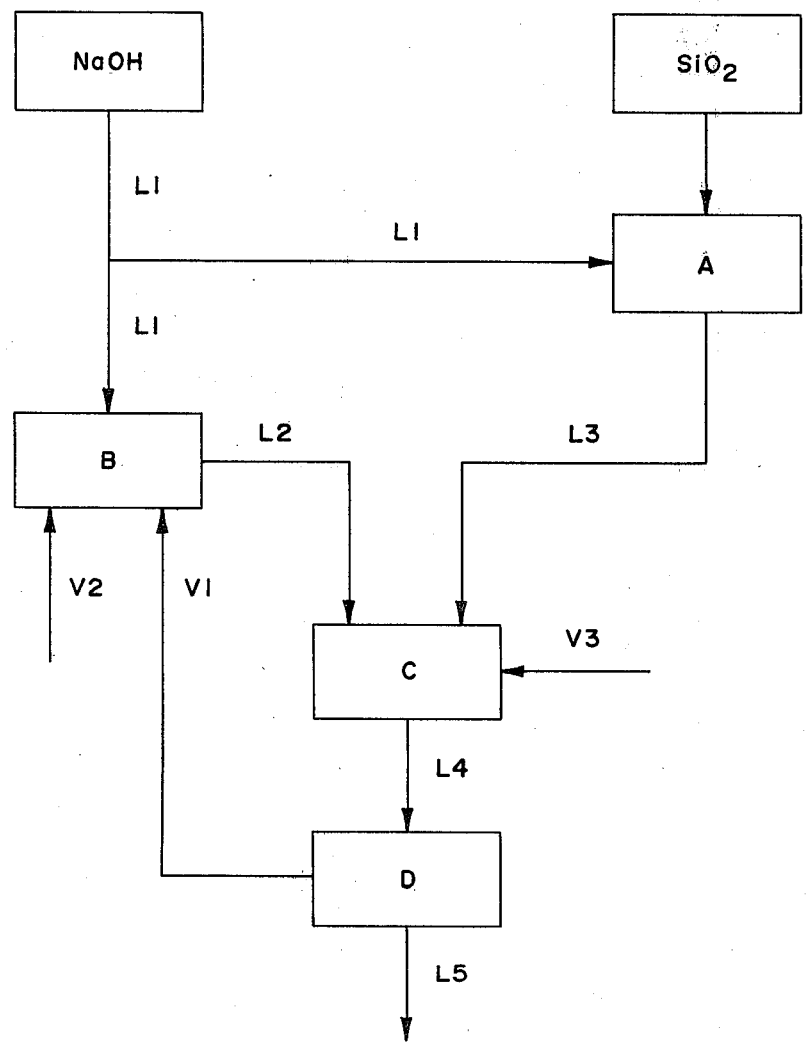

PROCESS FOR THE MANUFACTURE OF SODIUM SILICATE

BACKGROUND OF THE INVENTION

The present invention relates to the preparation of sodium silicate from quartz by reaction with caustic soda in aqueous medium, under pressure.

The existing processes for the industrial production of sodium silicate generally comprise:

(i) a calcination of the mixture of sand and sodium carbonate at over 1100° C.;

(ii) a solubilization of the sodium silicate having thus been obtained, in the autoclave at moderate pressure, i.e., 2 to 5 bars; and (iii) a filtration.

Such processes are costly, since the calcination consumes fuel such as fuel oil or coal. Furthermore, the calcination installation requires a great deal of maintenance because of the possibility of attack on the refractory materials by the sodium carbonate.

Consequently, various efforts have been made in order to eliminate the calcination of the mixture of sand and sodium carbonate and to carry out directly the solubilization of silica by heating in an autoclave with sodium hydroxide; as described more particularly in Chemical Engineering 1962, Feb. 2, p. 76-78 and U.S. Pat. No. 2,881,049.

In order to control and avoid the corrosion of the equipment, especially of the autoclaves, the solubilization is carried out at moderate pressures; i.e., 3 to 6 bars. However, the low temperatures which result from these pressures make it necessary to select the nature of the sand, to crush it or to have this sand undergo a pretreatment generally consisting of a calcination followed by water hardening.

Such processes thus proved to be just as burdensome as the calcination of the mixture of quartz and sodium carbonate, the latter being the only industrial process which is being used.

SUMMARY OF THE INVENTION

A process has now been invented for the manufacture of sodium silicate from quartz or quartz sand by heating in the autoclave with caustic soda, and which does not present the drawbacks of the previous processes.

Briefly, the present invention comprises a process for the manufacture of a sodium silicate solution in a continuous manner from a silicon dioxide-containing material, comprising continuously adding to a reaction zone a stream of said silicon dioxide-containing material and a stream of a sodium hydroxide-sodium carbonate solution, reacting said silicon dioxide-containing material and said sodium hydroxide-sodium carbonate at a temperature and pressure and for a time sufficient to form a sodium silicate solution, and recovering said sodium silicate solution from the reaction zone.

BRIEF DESCRIPTION OF THE DRAWING

The single FIGURE is a schematic diagram of the process of the invention.

DETAILED DESCRIPTION

The silicon dioxide-containing material used can be quartz or sand; the latter because of the prevalence of quartz is commonly referred to as "quartz sand". It is preferred to use quartz sand. The instant process does not require any pretreatment of the sand or sand of any particular nature or physical structure, except that the size of the grains must be below 1 mm, and in some instances this may require a crushing operation.

The problems of corrosion by the caustic soda (sodium hydroxide) have been solved by using a caustic soda solution containing sodium carbonate, by carrying out a preheating of the sodium hydroxide solution in appropriate exchangers made of nickel which thus do not run the risk of being abraded by the quartz, and by carrying out a continuous solubilization of the quartz by heating in an autoclave.

The autoclave or autoclaves thus are not necessarily lined with nickel on the interior in order to solve the problems of corrosion by the caustic soda. They are made of regular steel, and lead to a noticeably reduced plant investment and maintenance expenses.

This process makes it possible to obtain a solution of sodium silicate at a cost which is clearly lower than present-day processes. Moreover, this solution contains less than 30 to 40 mg. of Fe per liter. It can therefore be used, in particular, in order to manufacture very white zeolites.

The different steps of the process are illustrated in the accompanying drawing and are:

1. The raw materials consist of quartz sand passing through a 1 mm sieve and an industrial caustic soda lye diluted to a concentration of 180 to 230 g of NaOH per liter. To this caustic soda solution are added 15 to 20 g of $Na_2CO_3$ per liter in order to obtain the "attack liquor" (L1).

2. At (A), the quartz is placed in suspension by mixing with a fraction of the sodium hydroxide solution (L1), in such a way that the dry matter content of the obtained suspension (L3) allows it being pumped under pressure into autoclave (C).

The quartz charge is such that the weight ratio of $SiO_2$/total NaOH brought into play falls into the 1.7–2.6 range.

3. At (B), the remainder of the sodium hydroxide solution (L1) is heated to a temperature of 250° to 280° C. in tubular or nickel-plated exchangers. This indirect heating is continuous thanks to the vapor (V1) recovered in the pressure-reducing valves (D) described below, plus a complementary input of vapor (V2). Since the heated solution does not contain quartz, there is no abrasion of the metal of the exchangers.

This "attack liquor" heated to 250°–280° C. or L2, is injected continuously into autoclave (C).

4. It is in this autoclave (C) that the solubilization of the quartz takes place in continuous manner.

The "attack liquor" (L2) and the quartz suspension (L3) are introduced continuously. These injections of solution and of suspension are carried out under pressure.

The temperature in the autoclave or autoclaves amounts to 225° to 245° C., with the pressure going from 27 to 32 bars, and the reaction time from 20 to 35 minutes. Under these conditions, the solubilization of the quartz, whatever its origin may be, is rapid.

This rapid continuous solubilization makes it possible to obtain a steady solution in the autoclave, which contains over 160 g of solubilized $SiO_2$ per liter and is not corrosive toward the regular steel being employed in the autoclave, since the sodium hydroxide is neutralized by the solubilized silica.

The temperature of the autoclaves is maintained by injection of vapor (V3). At the outlet of autoclaves C, over 95% of the quartz charge has been solubilized.

5. The suspension (L4) coming out of the autoclaves and composed of sodium silicate, containing the quartz not having reacted, is cooled and its pressure is brought back to atmospheric pressure in a series of pressure-reducing flashes (D). The emitted vapor (V1) is reused at (B) for the preheating of the sodium hydroxide solution.

The silicate solution (L5) can be diluted in order to avoid the crystallization of the silicate, $Na_2O.SiO_2$, decanted and filtered. The separated solid is partially recycled at (A). The obtained sodium silicate solution is characterized by a silica concentration of 320 to 370 g of $SiO_2$ per liter, a concentration of 160 to 200 g of NaOH per liter, and an iron content below 40 mg of Fe per liter.

This solution is prefectly suitable for the manufacture of sodium silico-aluminate and, in particular, zeolite.

The invention will be further described in connection with the following example which is set forth for purposes of illustration only.

EXAMPLE 1

A solution of caustic soda (sodium hydroxide) and of sodium carbonate is prepared from 428 kg of soda lye containing 193 kg of NaOH, to which 8 kg of $Na_2CO_3$ and 570 kg of water are added.

The solution (L1) which is obtained has a volume of 0.83 m³ and contains:

| | |
|---|---|
| NaOH | 193 kg |
| $Na_2CO_3$ | 8 kg |
| $H_2O$ | 805 kg |

A fraction of this solution; i.e., a volume of 0.21 m³ is utilized at (A) in order to place a charge of 343 kg of sand containing 341 kg of $SiO_2$ into suspension.

The suspension (L3) which is obtained has a volume of 0.34 m³. It is injected into autoclave (C).

Simultaneously, the remainder of solution (L1) is heated at (B) to 275° C., then injected into autoclave (C).

In the autoclave, the suspension has a temperature regulated to 240° C., with the heating up taking place very rapidly, and the pressure amounts to 27 bars. The reaction time at that temperature and under that pressure amounts to 25 minutes.

At the end of this reaction under pressure, the suspension is cooled by flash, then diluted with 0.22 m³ of water, and subsequently decanted and filtered. The separated solid has a total weight of 15 kg. It contains 13 kg of $SiO_2$.

The filtered solution has a volume of 1.03 m³.

It contains:

| | |
|---|---|
| NaOH | 191 kg |
| $Na_2CO_3$ | 7.5 kg |
| $SiO_2$ | 328 kg |
| Fe | 32 g |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention has defined by the appended claims.

What is claimed is:

1. A process for the manufacture of a sodium silicate solution in a continuous manner from a silicon dioxide-containing material, comprising continuously adding to a reaction zone a stream of said silicon dioxide-containing material and a stream of a sodium hydroxide-sodium carbonate solution, reacting said silicon dioxide-containing material and said sodium hydroxide-sodium carbonate at a temperature of from about 225° to 245° C. and pressure of from about 27 to 32 bars for a time of from about 20 to 35 minutes, and recovering said sodium silicate solution from the reaction zone.

2. The process of claims 1 or 2 wherein the sodium hydroxide-sodium carbonate solution contains NaOH in a concentration of 180 to 230 grams/liter and $Na_2CO_3$ in a concentration of 15 to 20 grams/liter.

3. The process of claim 1 wherein the silicon dioxide containing material is quartz sand which is placed into suspension with a portion of said sodium hydroxide-sodium carbonate solution prior to being added to said reaction zone.

4. The process of claim 3 wherein the remainder of said sodium hydroxide-sodium carbonate solution is heated to a temperature of about 250° to 280° C. prior to being added to said reaction zone.

5. The process of claim 4 wherein the weight ratio of $SiO_2$/total NaOH being reacted is from about 1.7–2.6.

6. A process for the manufacture of a sodium silicate solution in a continuous manner comprising forming a suspension of quartz sand having a grain size below 1 mm in a portion of a solution of sodium hydroxide-sodium carbonate containing 180 to 230 grams/liter of NaOH and 15 to 20 grams/liter of $Na_2CO_3$, heating the remainder of said sodium hydroxide-sodium carbonate solution to a temperature of 250° to 280° C., continuously adding a stream of said quartz sand suspension and a stream of said heated solution to a reaction zone to form a reaction mixture, maintaining said reaction zone at a pressure of 27 to 32 bars and the reaction mixture at a temperature of 225° to 245° C., and recovering a sodium silicate solution from said reaction zone after the reaction has continued for 20 to 35 minutes.

* * * * *